United States Patent
Cepulis et al.

(10) Patent No.: US 6,496,945 B2
(45) Date of Patent: Dec. 17, 2002

(54) COMPUTER SYSTEM IMPLEMENTING FAULT DETECTION AND ISOLATION USING UNIQUE IDENTIFICATION CODES STORED IN NON-VOLATILE MEMORY

(75) Inventors: Darren J. Cepulis, The Woodlands; Sid Young, Jr., Houston, both of TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 98 days.

(21) Appl. No.: 09/090,123

(22) Filed: Jun. 4, 1998

(65) Prior Publication Data

US 2001/0042225 A1 Nov. 15, 2001

(51) Int. Cl.$^7$ ................................................ G06F 11/00
(52) U.S. Cl. ............................................ 714/25; 714/8
(58) Field of Search ........................... 714/3, 5, 25, 30, 714/36, 42, 44, 48, 47, 733, 7, 8, 45, 723; 713/1, 2, 100; 710/15, 17, 19

(56) References Cited

U.S. PATENT DOCUMENTS

| | | | | |
|---|---|---|---|---|
| 5,388,224 A | * | 2/1995 | Maskas | 710/104 |
| 5,513,327 A | * | 4/1996 | Farmwald et al. | 710/129 |
| 5,598,528 A | * | 1/1997 | Larson et al. | 714/7 |
| 5,634,137 A | * | 5/1997 | Merkin et al. | 710/10 |
| 5,655,148 A | * | 8/1997 | Richman et al. | 710/8 |
| 5,692,189 A | * | 11/1997 | Lipe | 713/1 |
| 5,748,980 A | * | 5/1998 | Lipe et al. | 710/8 |
| 5,751,936 A | * | 5/1998 | Larson et al. | 714/7 |
| 5,787,246 A | * | 7/1998 | Lichtman et al. | 709/220 |
| 5,793,979 A | * | 8/1998 | Lichtman et al. | 709/226 |
| 5,809,329 A | * | 9/1998 | Lichtman et al. | 710/8 |
| 5,974,546 A | * | 10/1999 | Anderson | 713/2 |
| 6,023,271 A | * | 2/2000 | Goodrum et al. | 714/56 |
| 6,044,411 A | * | 3/2000 | Berglund et al. | 710/9 |
| 6,044,423 A | * | 3/2000 | Seo et al. | 710/19 |

OTHER PUBLICATIONS

"PCI Local Bus Specification," Revision 2.0, pp. 3–6, Apr. 1993.*
"PCI Local Bus Specification," Revision 2.0, pp. 14,65–69, 149–158, 163,166–168, Apr. 1993.*

* cited by examiner

Primary Examiner—Gail Hayes
Assistant Examiner—Christopher Revak
(74) Attorney, Agent, or Firm—Conley, Rose & Tayon, P.C.; Michael F. Heim

(57) ABSTRACT

A computer system implementing a fault detection and isolation technique that tracks failed physical devices by identification (ID) codes embedded in each component of the computer for which the ability to detect faults and isolate failed devices is disclosed. The computer system comprises one or more CPU's, one or more memory modules, a master control device, such as an I$^2$C master, and a North bridge logic device coupling together the CPU's, memory modules, and master control device. The master control device also connects to the CPU's and memory modules over a serial bus, such as an I$^2$C bus. Each CPU and memory module includes an ID code that uniquely identifies and distinguishes that device from all other devices in the computer system. The computer also includes a non-volatile memory device coupled to the CPU for storing a failed device log which includes a list of ID codes corresponding to failed physical devices. After a device is determined to be non-functional, one of the CPU's stores that device's unique ID code in the failed device log. Using the list of physical devices from the failed device log, the CPU creates a logical resource map which includes a list of logical addresses of all available (i.e., fully functional) devices. The logical resource map is provided to the computer's operating system which isolates failed devices by only permitting access to those logical devices listed as available in the logical resource map.

22 Claims, 2 Drawing Sheets

COMPUTER SYSTEM IMPLEMENTING FAULT DETECTION AND ISOLATION USING UNIQUE IDENTIFICATION CODES STORED IN NON-VOLATILE MEMORY

BACKGROUND OF THE INVENTION

1. Field of the Invention

The present invention generally relates to fault detection in computer systems. More particularly, the invention relates to the use of unique device identification codes stored in non-volatile memory to track failed devices in a computer system. Still more particularly, the present invention relates to a system in which failed components may be tracked physically through the use of stored or embedded identification codes.

2. Background of the Invention

A personal computer system includes a number of components with specialized functions that cooperatively interact to produce the many effects available in modem computer systems. These components typically include one or more central processing units (CPU's), an array of random access memory (RAM) modules, and certain peripheral devices such as a floppy drive, a keyboard, and a display. The components generally are interconnected by one or more "busses." A bus is a collection of digital signal lines over which data, address, and control signals are conveyed between devices connected to the bus according to a predetermined protocol. Examples of industry standard bus protocols include the Peripheral Component Interconnect (PCI) bus, the Industry Standard Architecture (ISA) bus, and Universal Serial Bus (USB).

For a computer system to operate successfully and efficiently, its components must function correctly. To ensure proper operation in the event of a failed component, the computer system must be capable of (1) detecting the failure, and (2) isolating the failed component so it is no longer accessed. Accordingly, many computer systems include logic for detecting when a device has failed and isolating the failed device to prevent its subsequent use by other devices (such as the CPU) in the computer system. Although the sophistication of personal computer systems continues to increase, there continues to be a concern that components may fail during operation. To protect against this eventuality, fault detection systems continue to play an important role in the operation of computer systems. The present invention relates to an improved fault detection and isolation technique.

To understand conventional fault detection and isolation schemes, it is important to understand the interaction between the computer's hardware components and the operating system (e.g., Windows® 95). Application software, such as a word processor or game, uses the operating system to access the computer's hardware components to manipulate data. For example, a particular application program may require access to data on a hard disk drive. The operating system translates a data access request from the application program into one or more device level operations to obtain the requested data for the application program. The application program need not access the hard disk directly, but does so indirectly via the operating system.

Many devices, such as system memory and the CPU are assigned a "logical" address during system initialization ("boot-up"). As such, it is common to refer to a "physical" device or a "logical" device; the physical device refers to the actual hardware device, and the logical device and refers to the device as it is mapped into the logical address space. For example, system memory may comprise 4 megabyte (MB) dual in-line memory modules (DIMM's). Each physical DIMM, therefore is a 4 MB "physical" DIMM. During boot-up, each physical DIMM is assigned a 4 MB logical address range. One physical DIMM might be assigned the 0–4 MB address range, while another DIMM might be assigned the 4–8 MB address range. The operating system accesses a particular memory location in each DIMM typically by using its starting logical address (0, 4 MB, etc.), and also an offset from the starting logical address to the targeted memory location.

Assigning logical addresses to physical devices permits efficient use of the computer's physical resources by the operating system and applications software. Software can then be developed to run on computers with different hardware configurations; the software need only be aware of the logical addresses of the various devices. Further, if a user moves a physical device from one location in the computer to a new location, the logical address assignment may change (during boot-up) and the computer's software and operating system will be unaffected other than being made aware of the device's new logical address.

Most computer systems run various tests during boot-up in a process generally referred to as "power on self test" (POST). The POST routines are part of the Basic Input Output System (BIOS) code that is stored in read-only memory (ROM) and executed by the CPU. During execution of the POST routines, the various devices in the computer system, such as the CPU and memory, are tested to ascertain whether each device is working properly. Different types of devices are tested in different ways. Memory, for example, is tested by writing (i.e., storing) a known test data value to the memory device to be tested, and then reading (i.e., retrieving) the data value from the memory device to ensure the value read matches the value written. If a match does not exist, the memory is deemed defective; otherwise, the device is assumed to be functional. A CPU typically includes logic to test itself. The operational state of a CPU can be ascertained by the BIOS code reading the contents of various status registers internal to the CPU that indicate the CPU's functional states. Device testing also occurs to a certain extent after POST while the computer system is undergoing normal operation.

After the computer's hardware devices are tested, the BIOS code provides the operating system with a Logical Resource Map (LRM) which includes the logical addresses of only those devices that are fully functional. The operating system will not permit access to those logical devices not listed in the LRM, thereby isolating those devices from use in the computer. Further, if a device fails during operation of the computer and the failure is detected, the logical resource map is changed to indicate to the operating system that the failed device is no longer available.

The CPU also uses the BIOS code to maintain a list of failed logical devices in a "failed device log" (FDL) stored in non-volatile memory (i.e., memory whose contents are not erased when power is removed from the device). During boot-up, the BIOS code reads the failed device log to determine which logical devices were previously reported as failed. As the BIOS code creates the logical resource map to be provided to the operating system, the BIOS code will not include those logical devices that have been reported previously as failed. Accordingly, fault detection and isolation involves determining that one or more of the computer devices is defective, and prohibiting further access to that device by the operating system even after the computer has been turned off and then re-started.

The user, however, may wish to take remedial actions when the computer reports the presence of a failed device. For example, if the BIOS code determines that a CPU is defective, the user may replace the defective CPU with a new CPU. If a memory device has failed, the user may wish to replace the defective memory device or simply add additional memory modules without removing the defective device. In some situations, only a portion of the memory device has failed and most of the memory locations in the memory device may still be fully functional. As such, the user may not wish to replace the memory device. Instead, the user may leave the partially defective memory device in the computer and add an additional memory device to make up for the loss of memory capacity resulting from the defective memory locations.

When repairs or alterations to the computer configuration are made, the possibility exists that the FDL will no longer match the physical configuration of the computer. The following examples illustrate this problem. If a user removes a defective device, such as a CPU, and replaces it with a new device, the new CPU likely will be assigned the same logical address as the defective CPU. The FDL identifies which logical devices had previously been reported as failed. Upon subsequent system initialization, the BIOS will read the FDL and erroneously determine that the device at that logical address is still defective. Further, the new logical CPU will not be included in the LRM. Unless the user tells the computer system that the defective CPU has been replaced, the operating system will not permit access to the new CPU simply because the logical address associated with that new device is still tagged as failed in the FDL, and accordingly is not included in the LRM. This erroneous result can be remedied by the user running a known utility program that resets the failed device log so that upon subsequent boot-up, the logical address associated with the replaced device is associated with a previously identified failed component. This solution, however, places a burden on the user to know that it is necessary to run such a utility program, to know which utility program to run, and how to run the program.

Another example of the mismatch that can occur between the physical configuration of a computer and the failed device log relates to the system memory. Most computer systems available today include system memory comprising one or more memory modules. The memory modules may be implemented as single in-line memory modules (SIMM's), dual in-line memory modules (DIMM's), or any other type of available memory technology. These memory modules typically include connectors that mate with corresponding connectors (commonly referred to as "slots") on the computer system "mother" board. Many computers include connectors for eight or more memory modules, although not all of the available slots need be populated with memory modules.

The BIOS code assigns a logical memory address range to each memory module on the mother board. If one of the memory modules is found to be defective and, instead of replacing the defective memory module, the user simply adds a new module, it is possible for the newly inserted memory module to be assigned the logical address range previously assigned (i.e., assigned the last time the computer was turned on) to the defective memory module. Further, the defective memory module may be given a logical address range different than previously assigned to the defective module and not previously tagged as failed in the failed device log. During subsequent boot-up, the BIOS will read the FDL and, unless a suitable utility program is run by the user, the BIOS will report to the operating system via the logical resource map that the newly inserted memory module is defective. This erroneous result occurred because the new memory module was assigned the logical address range previously assigned to the defective module. Further, the BIOS will also erroneously report to the operating system that the defective memory module is available for use because its logical address range had not been previously tagged as failed in the failed device log. These problems can be remedied by the user running a utility program to inform the BIOS code of the new memory configuration. As noted above, however, running the utility program places an undesirable burden on the user.

Accordingly, a computer system that solves the problems noted above would be beneficial. Such a computer system preferably would be capable of accurately tracking failed devices even if those devices have been replaced or assigned to different logical addresses. Further, the new computer system preferably reduces or eliminates the necessity of the user running utility programs when a physical device is removed or replaced or a new device is added to the computer. Despite the advantages that such a system would offer, to date no such system has been introduced.

BRIEF SUMMARY OF THE INVENTION

The deficiencies of the prior art described above are solved in large part by a computer system implementing a fault detection and isolation technique that tracks failed physical devices by identification (ID) codes embedded, or otherwise stored, in particular computer components. Examples of such devices in which ID codes could be embedded include, for example, the CPU (or CPU's if multiple processors are included in the computer system) and memory modules comprising the computer's main system memory. The use the embedded or storage ID codes enables the fault detection and isolation technique to track physical devices instead of logical devices.

In accordance with the preferred embodiment, the computer system comprises one or more CPU's, one or more memory modules, a master control device, such as an $I^2C$ master, and a North bridge logic device coupling together the CPU, memory modules, and master control device. The master control device also connects to the CPU and memory modules over a serial bus, such as an $I^2C$ bus. Each CPU and memory module, and any other device for which physical tracking is desired, includes an ID code that uniquely identifies and distinguishes that device from all other devices in the computer system. The computer also includes a non-volatile memory coupled to the CPU by way of the North bridge device. After a device is determined to be non-functional, either during POST or during normal system operation, a CPU stores that device's unique ID code in a failed device log in the non-volatile memory. Using the list of failed physical devices, the CPU creates a logical resource map which includes a list of logical addresses of all available (i.e., fully functional) devices. The logical resource map is provided to the computer's operating system which only permits access to those logical devices listed as available in the logical resource map.

During initialization, a CPU reads the list of ID codes from the failed device log, and the master control device retrieves the ID code from each physical device connected to the master control device. The master control device provides the retrieved ID codes from each device to the CPU, which then compares the list of ID codes from the failed device log with the list of ID codes retrieved from the devices by the master control device. If one of the device ID codes matches an entry in the failed device log, the CPU does not include the logical address associated with that physical device in the logical resource map. The operating system will not permit access to a logical device that is not listed in the logical resource map.

By tracking failed devices using an ID code unique to each device, the pitfalls described above regarding tracking logical devices can be avoided. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

A better understanding of the present invention can be obtained when the following detailed description of the preferred embodiments is considered in conjunction with the following drawings, in which.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
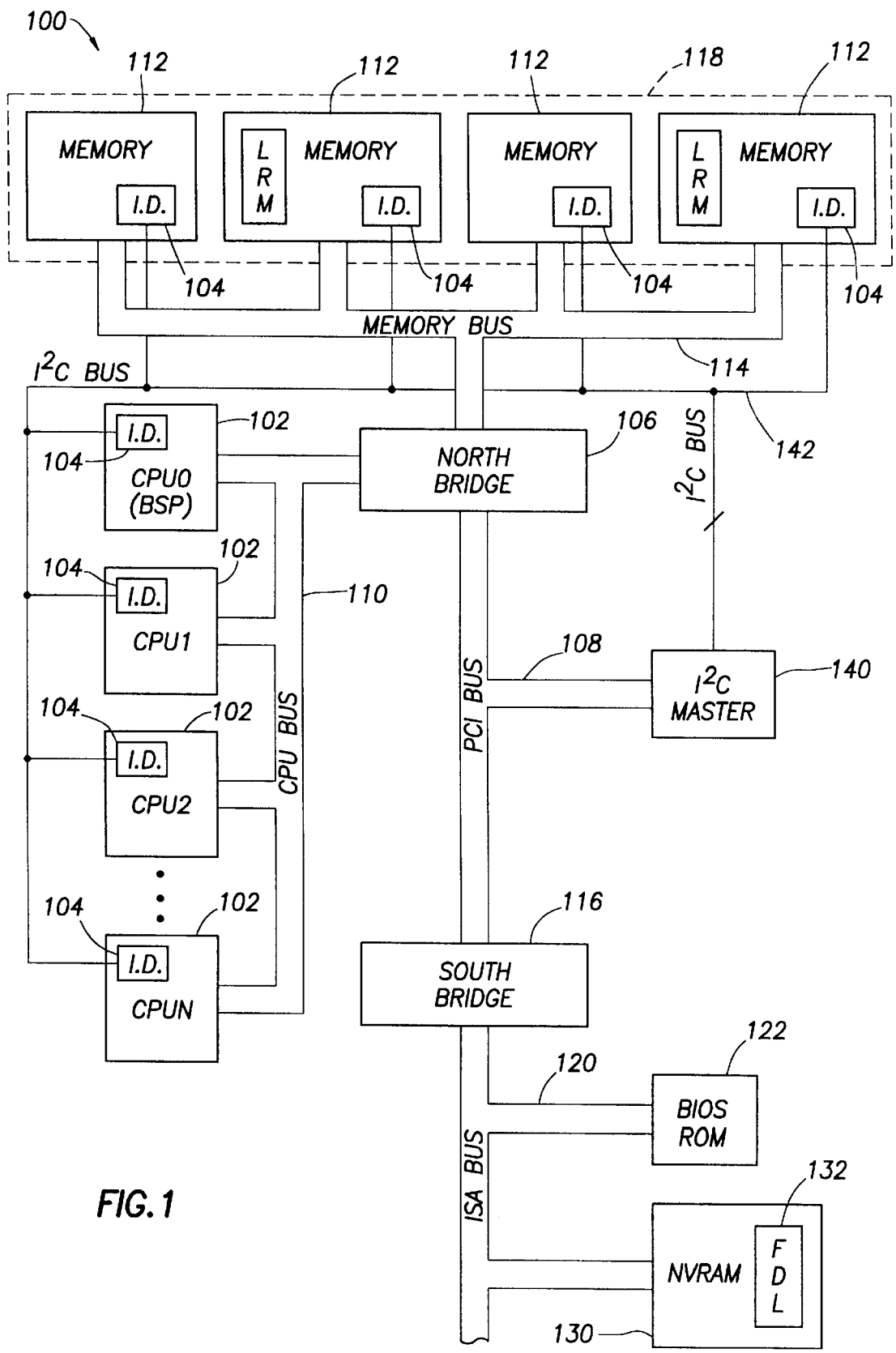
FIG. 1 is a block of a computer system constructed in accordance with the preferred embodiment hand including devices with embedded identification numbers.

Referring now to FIG. 1, a computer system 100 constructed in accordance with the preferred embodiment generally includes one or more CPU's 102, a system memory array 118, a North bridge logic device 106, a South bridge logic device 116, a BIOS ROM 122, a non-volatile Random Access Memory (NVRAM) 130, and an Inter Integrated Circuit (I²C) master 140. It should be recognized that the architecture depicted in FIG. 1 is merely illustrative of one embodiment of the invention and that numerous other architectures are also possible and may be implemented in accordance with the present invention.

As shown in FIG. 1, the CPU's 102 are labeled as CPU 0, CPU 1, CPU 2, and CPU N. Although the preferred embodiment may include any number of CPU's, computer system 100 may include only one CPU if desired. In the following discussion, a single CPU will be referred to with the understanding that multiple CPUs could be provided in the computer system. The CPUs can be implemented using any suitable microprocessor, such as a Pentium® or Pentium® II (manufactured by Intel), or K6® (manufactured by Advanced Micro Devices). The Pentium® II architecture, for example, can support up to four CPUs (N=3).

The CPU 102 preferably connects to the North bridge 106 through a CPU bus 110. The North bridge 106 includes logic to couple the CPU 102, the memory array 118, and a primary expansion bus 108. The primary expansion bus 108 is depicted in FIG. 1 as a Peripheral Component Interconnect (PCI) bus, but any suitable expansion bus architecture can be used. The North bridge 106 preferably connects to the memory array 118 by way of memory bus 114. The North bridge device 106 facilitates the transfer of data and commands between devices connected to the CPU, memory, and PCI buses 110, 114, and 108, respectively. The North bridge 106, for example, permits the CPU 102 to communicate with the I²C master 140. The North bridge 106 thus translates signals from one bus architecture to another bus architecture. The North bridge device 106 also preferably includes a memory controller (not specifically shown) for controlling access to the memory array 118 by the CPU 102 and other devices in the computer system that require access to memory.

Memory array 118 preferably includes one or more memory modules 112. The memory modules 112 may comprise any type of suitable memory technology currently known or subsequently developed such as Dynamic Random Access Memory (DRAM), Extended Data Out Dynamic Random Access Memory (EDO DRAM), and Synchronous Dynamic Random Access Memory (SDRAM). Further, the memory modules 112 may be packaged as Single In-Line Memory Modules (SIMM'S), Dual In-Line Memory Modules (DIMM'S), or any other type of physical architecture desired. The North bridge 106 provides a communication path through which information, such as status and configuration information, data, and code, can be written to or read from memory modules 112. For example, CPU-to-memory write commands (commands initiated by a CPU that include data to be stored in memory) are provided to the memory array 118 via the North bridge 106. The memory controller in the North bridge 106 processes the write commands from the CPU 102 and initiates communication with the memory array 118 to store the data.

The computer system 100 also preferably includes a South bridge 116 for coupling together the primary expansion bus 108 and a secondary expansion bus 120. As shown, the secondary expansion bus 120 comprises an Industry Standard Architecture (ISA) bus, but can also implement other bus protocols such as the Extended Industry Standard Architecture (EISA) bus, the IEEE 1394 standard (or "fire wire") bus, or any of a variety of other busses that are presently available or may become available in the future. Although not shown, other busses, such as the Intelligent Device Electronics (IDE) bus and devices, such as a keyboard controller, may connect to the South bridge 116 as well. The terms "North" and "South" are used to refer to the North and South bridge devices 106 and 116, respectively, simply because of the relative locations these devices occupy in the block diagram of FIG. 1.

Referring still to FIG. 1, the BIOS ROM 122 and NVRAM 130 preferably couple to the South bridge 116 via the ISA bus 120. The BIOS ROM 122 contains firmware embedded on the ROM that performs a number of low-level functions. For example, the BIOS code performs the Power On Self Test ("POST") during boot-up to initialize and test the computer's hardware. The BIOS code also is responsible for loading the operating system into the computer's main system memory array 118. Further, the BIOS code handles the low-level input/output transactions to the various peripheral devices such as a hard disk drive (not shown). The BIOS code is accessed by issuing BIOS "calls," each call including a value to identify the type of transaction desired. Such BIOS calls are well known to those of ordinary skill in the art.

During the boot-up sequence, one of the CPU's 102 is designated as the "boot strap" processor and, as such, begins executing the boot-up code included as part of the BIOS ROM code. In FIG. 1, the boot strap processor (BSP) is shown as CPU 0. During the boot-up process, the boot strap processor (CPU 0) copies the BIOS code from the BIOS ROM 122 into the memory array 118. As subsequent calls to the BIOS code are required, such calls are then made to the copy of the BIOS code stored in the memory array 118.

Referring still to FIG. 1, each CPU 102 and memory module 112 includes a memory storage unit 104 for storing an identification (ID) code. Each memory storage unit 104 comprises a non-volatile memory such as an Electrically Erasable Read Only Memory (EEPROM), battery backed-up (RAM), or other type of memory device capable of retaining its contents without power. The ID code preferably permits the computer system to uniquely identify each physical device. Accordingly, each device includes an ID code that preferably is different from the ID codes of other devices in the computer system 100. The size of each ID memory unit 104 can be any suitable number of bits, and preferably includes a sufficient number of bits to permit the storage of an ID code with enough characters to distinguish each possible memory module and CPU. For example, each ID memory unit 104 may comprise 16 bytes of storage with each byte storing an ASCII character representing a single character in the device's ID code. Each ID memory unit 104 may be programmed by the manufacturer of the device or by the manufacturer of the computer system using known programming techniques. Further, the ID code may comprise the device's serial number or any other alphanumeric value that uniquely identifies the device. Additionally, one or more of the memory modules 112 includes a Logical Resource Map (LRM) which will be described below with reference to FIG. 2.

The use of a device ID code to solve the problems noted above will be explained in greater detail below. Generally, computer system 100 "tags" (i.e., identifies) a device that has failed using its unique ID code rather than the logical address associated with that physical device. In this way, if a failed device is replaced with a new device, the computer system will recognize that a new device has been inserted into the system by virtue of its unique identifier code. As such, the fault detection and isolation technique used in computer system 100 tracks failed physical devices, rather than failed logical devices. The preferred embodiment of the invention shown in FIG. 1 is illustrated only with respect to device ID codes stored in CPU 102 and memory modules 112. However, the use of a unique ID code identifier can be extended to other devices, such as extended memory on a PCI memory card, a floppy disk drive, or any other type of device desired.

The NVRAM 130 preferably stores configuration information and data that must be retained even after the computer is shut off (i.e. power is removed from the system). Such configuration information and data is used for configuring the computer system for general use. The NVRAM 130 preferably comprises an EEPROM, a battery backed-up RAM, or any other type of memory device whose contents are not lost when power is removed.

In accordance with the preferred embodiment of the invention, computer system 100 implements a suitable fault detection scheme to test various devices, such as the CPU 102 and memory modules 112, for defects. As noted above, the particular fault detection scheme used depends on the type of device to be tested. Any suitable technique for determining when a device has failed, can be employed. Regardless of which fault detection technique is used, computer system 100 determines whether a device has failed. The term "failed" is meant to refer to any device that falls short of full operational status, such as a device that is completely unable to function, partially unable to function, or is unable to communicate with other devices. The computer system 100 detects device failures preferably during POST and during normal system operation.

The NVRAM 130 also includes storage capacity for a Failed Device Log (FDL) 132. The FDL 132 includes a list of those components in the computer system 100 that have been tagged as failed. If a device is determined to be defective, one of the CPU's 102 places an entry into the FDL 132 identifying that physical device as failed. The "entry" into the FDL may simply include the unique ID code associated with the failed physical device. Thus, in accordance with the preferred embodiment, the devices identified as failed in the FDL 132 are listed according to the unique ID code for each failed device. Alternatively, the FDL entry to identify a failed physical device may include setting a bit in the FDL corresponding to the failed device. Moreover, any technique for identifying in the FDL which physical devices have failed is consistent with the principles of the present invention and this disclosure, and the claims that follow, should be interpreted as including any such technique.

Referring still to FIG. 1, the I²C master 140 preferably connects to the PCI bus 108 and thus communicates with one or more of the CPU's 102 via North bridge 106. The I²C master 140 includes any suitable type of I²C bus master device such as PCD8584 manufactured by Phillips. The CPU 102 preferably can program and read data from the I²C master 140. The I²C master 140 also preferably includes an interface to the I²C bus 142. Through the I²C bus 142, the I²C master connects to the memory modules 112 and the CPU's 102. The I²C bus 142 can also be routed to other hardware devices in the computer system for which fault detection and isolation is desired. The I²C master 140 preferably is capable of using the I²C bus to read the unique ID code stored in the memory unit 104 of each CPU 102 and memory modules 112. The ID code is supplied by the device to the I²C master 140 over the I²C bus 142 in response to a read command issued by the I²C master 140. The communication protocol for the I²C bus is described in "The I²C Peripherals for Microcontrollers Data Book," Signetics Phillips Semiconductors, 1992. The I²C bus 114 generally permits the transfer of a single byte at a time across the bus. If an ID code comprises only a single byte value (or less than 8 bits) the I²C master 140 preferably transfers the byte to the boot strap processor (CPU 0) for comparison with the FDL 132 as described below. If an ID code, however, is large enough to require more than a single byte of storage in memory units 104, the transfer of the ID code requires the I²C master 140 to initiate the transfer of each byte of the ID code. After the I²C master 140 receives a byte representing a portion of an ID code for a device, that byte is transferred to the boot strap processor over the PCI bus 108, via the North bridge 106. The boot strap processor receives the bytes representing portions of the ID code, one at a time, from the I²C master 140 and concatenates the bytes together to reassemble the full ID code.

It should be recognized that the invention can be implemented with other bus architectures in place of the I²C bus 142. An example of alternative bus architectures include Microwire bus. If an alternative bus architecture is used, the I²C master 140 may be replaced with a suitable master for operating the selected bus.

The operation of computer system 100 to solve the problems noted above will now be described with respect to the block diagram of FIG. 1 and the flowchart 200 of FIG. 2. The boot strap CPU (CPU 0) executes BIOS code to perform the function of steps 202, 204, 206, 210, 212, 214, 216, and 218. The I²C master 140 preferably performs step 208. Flow chart 200 generally describes an initialization process for the computer system 100 during which the boot strap processor (CPU 0) creates or updates the Logical Resource Map (LRM) which is stored in memory array 118. The LRM contains a list of the logical devices that are available for use, (i.e. the logical devices that are not defective), and upon completion of the boot-up process, the BIOS provides the LRM to the operating system. The operating system prohibits the use of those devices that are not listed in the logical resource map.

Figure 2:
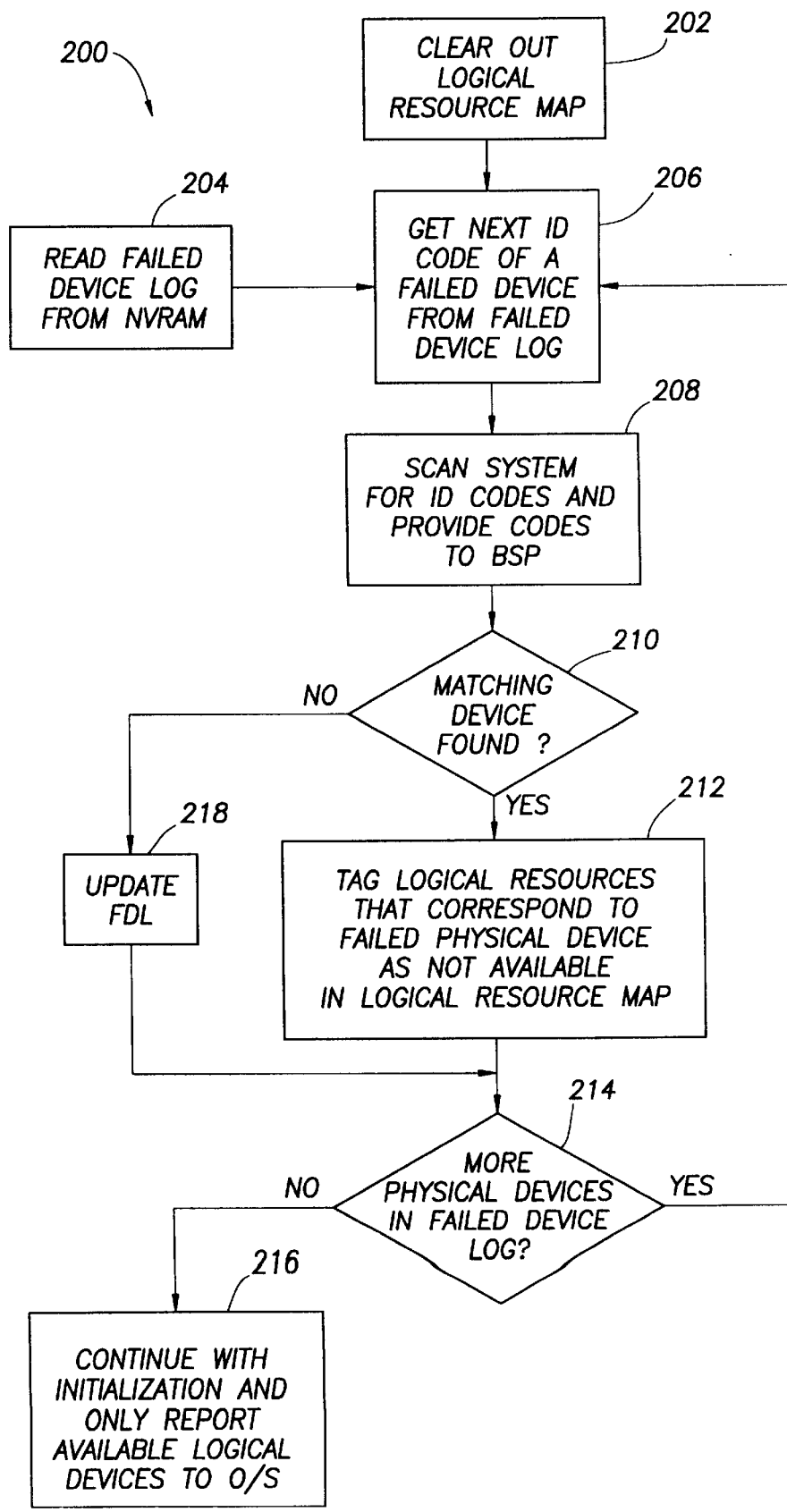
FIG. 2 is a flowchart representing a preferred method for determining which devices in the computer system of FIG. 1 are available for use and which devices are defective.

In step 202 of FIG. 2, the LRM is cleared out (i.e. reset to indicate that all logical devices in the computer system are available to the operating system). In step 204, the BIOS code reads the FDL 132 from NVRAM 130 and preferably stores a copy of the FDL in system memory array 118. As noted above, the FDL 132 includes a list of the ID codes corresponding to those physical devices that previously have been tagged as failed. In step 206, the BIOS code (which is executed by the boot strap processor), examines the FDL 132 to obtain the next ID code of a failed device. The boot strap processor commands the I²C master 140 to read the ID codes from CPUs 102 and memory modules 112 (step 208). The I²C master 140 preferably provides the ID code values across the PCI bus 108, through the North bridge 106 and to the boot strap processor as described above.

In decision step 210, the boot strap CPU compares each ID code provided to it by the I²C master in step 208 with the ID code obtained from the FDL 132 in step 206. If no match is found, then the physical device corresponding to the ID code obtained in step 206 is no longer present in the computer system 100. Accordingly, the BIOS code updates the corresponding entry in the FDL 132 in step 218 to reflect that the physical device corresponding to the ID code provided to CPU 0 in step 206 is no longer present in the computer system. On the other hand, if a match is found in step 210, then the physical device corresponding to the ID code from step 206 is still present in the computer system (and presumably still defective) and the entry in the logical resource map corresponding to that physical device is tagged as failed in step 212 to indicate to the operating system that the device is not available.

After performing either step 218 or 212, depending on whether a match was found in step 210, control passes to decision step 214 in which the BIOS code determines whether there are any more failed physical devices listed in the FDL 132. If there is an additional device in the FDL 132, control passes back to step 206 and steps 208–212 are repeated. This process continues until the BIOS code determines that the FDL 132 does not include any more failed devices that have not yet been examined. At this point, the initialization process proceeds to step 216 in which the LRM is provided to the operating system and initialization continues.

By using a unique identifier embedded in each CPU, memory module, and any other desired device, computer system 100 solves the problems noted above by tracking failed physical devices instead of logical devices. As such, if a failed physical device is removed or replaced with a new device that is assigned to the same logical address as the failed device, the computer system will recognize the presence of the new device. Further, if a memory module fails and, rather than replacing that memory module, the user simply adds an additional memory module to the system, computer system 100 will be able to track which memory module is defective by its unique identifier. Moreover, the user need not run a separate utility program after replacing a failed device, adding a new device, or logically or physically relocating a failed device within the computer system, thus alleviating the inconvenience problems associated with conventional computer systems.

As an alternative embodiment, the FDL could reside on any other bus in the computer system, rather than the ISA bus 120 as shown in FIG. 1. For example, the FDL could reside on the I²C bus 142. In this case, a CPU could read the FDL via the I²C master 140, or the I²C master could be intelligent enough to read the log and isolate the failed physical devices itself. In this case, the CPU would still build the logical resource map for the operating system.

The above discussion is meant to be illustrative of the principles of the present invention. However, numerous variations and modifications will become apparent to those skilled in the art once the above disclosure is fully appreciated. It is intended that the following claims be interpreted to embrace all such variations and modifications.

What is claimed is:

1. A computer system, comprising:
    a memory device including a memory ID code that uniquely distinguishes said memory device from any other memory device, said memory ID code stored in a non-volatile portion of said memory device; and
    a CPU coupled to said memory device and capable of testing s aid memory device to determine if said memory device is functional;
    a non-volatile memory device coupled to said CPU and including storage capacity for a failed device log;
    a master control device coupled to said CPU and said memory device for retrieving said memory ID code from said memory device and providing said memory ID code to said CPU; and
    wherein said CPU is capable of isolating said memory device if said CPU determines said memory device is not functional and said failed device log capable of storing a list of memory ID codes corresponding to memory devices that have been determined to be non-functional by said CPU.

2. The computer system of claim 1 further including a plurality of memory devices, each memory device including a unique memory ID code stored in a non-volatile portion of said memory devices.

3. The computer system of claim 2 wherein during initialization of the computer system, the master control device retrieves the memory ID codes from said memory devices, provides said memory ID codes to said CPU, and said CPU compares said memory ID codes to the ID codes stored in said failed device log.

4. The computer system of claim 3 further including a secondary bridge logic device coupling said primary expansion bus to a secondary expansion bus and said non-volatile memory device containing said failed device log is connected to said secondary expansion bus.

5. The computer system of claim 4 wherein during system initialization said CPU a retrieves said failed device log from said non-volatile memory device for comparison with said memory ID codes retrieved from said memory devices by said master control device.

6. The computer system of claim 2 wherein said master control device comprises an I²C master and said I²C master connects to said memory devices via an I²C bus.

7. The computer system of claim 6 further including a primary bridge logic device coupling together said CPU and said memory device, and said primary bridge logic device also coupled to said I²C master via a primary expansion bus.

8. The computer system of claim 7 wherein said primary expansion bus comprises a PCI bus.

9. The computer system of claim 2 further including a plurality of CPUs coupled to said master control device and said memory devices, each of said CPUs including non-volatile memory storage capacity for a CPU ID code that unique to each CPU.

10. A method for fault detection and isolation in a computer system in which a plurality of devices include embedded device codes that uniquely identify each of said devices, each of said device codes being unique to the device in which it is embedded so that all of said devices have different embedded device codes, said method comprising:

determining whether a device in said computer system has failed;

reading the embedded device code from a device that has failed;

storing a device code corresponding to a failed device in a failed device log; and preventing the use of a failed device whose device code is stored in said failed device log.

11. The method of claim 10 wherein the step of reading the embedded device code includes transferring said device code from the failed device over an I²C bus.

12. The method of claim 10 wherein said computer system includes an operating system and the step of preventing the use of a failed device includes assembling a logical resource map and conveying said logical resource map to the computer's operating system.

13. The method of claim 12 further including the step of initializing said computer system by reading the device codes from said failed device.

14. The method of claim 13 wherein said initializing step further includes reading said embedded device codes and comparing said device codes with the device codes stored in said failed device code.

15. A computer system, comprising:

a CPU;

memory module;

a bridge logic device coupling together said CPU and said memory module;

a peripheral component coupled to said bridge logic device by a primary expansion bus;

said CPU, memory module and peripheral component each including a unique device serial number stored in non-volatile memory, each of said device serial numbers being unique from all other serial numbers; and a failed device log memory for storing a list of device serial numbers corresponding to failed devices.

16. The computer system of claim 15 further including an I²C master connected to said CPU, said memory module, and said peripheral component over an I²C bus, said I²C master capable of reading device serial numbers from said CPU, memory module, and said peripheral component.

17. The computer system of claim 16 wherein during initialization said I²C master reads said serial numbers from each of said CPU, memory module and peripheral component, and provides said serial numbers to said CPU, and said CPU reads said failed device log to obtain the list of devices identified as failed.

18. The computer system of claim 17 wherein said CPU compares said serial numbers provided by said I²C master with the serial numbers from said failed device log and if a serial number from the I²C master matches a serial number from the failed device log, the CPU isolates that device.

19. A computer system, comprising:

a plurality of electronic devices each including an ID code that uniquely distinguishes said electronic device from any other memory device, said ID code stored in a non-volatile portion of said electronic device; and a CPU coupled to said electronic device and capable of testing said electronic device to determine if each of said electronic devices is functional;

a master control device coupled to said CPU and said electronic devices for retrieving said ID codes from said electronic devices and providing said ID codes to said CPU; and non-volatile memory coupled to said CPU and including storage capacity for a failed device log;

wherein said CPU is capable of isolating said electronic devices if said CPU determines any of said electronic devices is not functional, said failed device log capable of storing a list of ID codes corresponding to electronic devices that have been determined to be non-functional by said CPU.

20. The computer system of claim 19 wherein during initialization of the computer system, the master control device retrieves the ID codes from said electronic devices, provides said ID codes to said CPU, and said CPU compares said ID codes to the ID codes stored in said failed device log.

21. The computer system of claim 19 wherein said master control device comprises an I²C master and said I²C master connects to said electronic devices via an I²C bus.

22. A computer system, comprising:

a plurality of CPUs including a boot-strap processor;

a plurality of memory modules;

a North bridge device coupling together said CPUs and said memory modules;

a master control device coupled to said the North bridge device via a primary expansion bus and coupled to said CPUs and said memory modules via serial bus;

wherein each CPU and each memory module include non-volatile memory for storing an ID code uniquely identifying each CPU and memory module, each of said ID codes unique to a specific CPU or memory module; and a non-volatile memory device coupled to said North bridge device for storing a failed device log that includes a list of ID codes associated with a CPU or memory module that has failed;

wherein said master control device retrieves said ID codes during initialization and provides said ID codes to said boot-strap processor which compares said retrieved ID codes with the list of ID codes in said failed device log to determine if a CPU or memory module that is listed in said failed device log as failed is present in said computer system.

* * * * *